(12) United States Patent  
Guering

(10) Patent No.: US 8,070,098 B2
(45) Date of Patent: Dec. 6, 2011

(54) AIRCRAFT TAIL CONE

(75) Inventor: Bernard Guering, Montrabe (FR)

(73) Assignee: Airbus Operations SAS, Toulouse (FR)

( * ) Notice: Subject to any disclaimer, the term of this patent is extended or adjusted under 35 U.S.C. 154(b) by 339 days.

(21) Appl. No.: 12/307,965

(22) PCT Filed: Jun. 28, 2007

(86) PCT No.: PCT/FR2007/001092
§ 371 (c)(1),
(2), (4) Date: Jan. 8, 2009

(87) PCT Pub. No.: WO2008/006955
PCT Pub. Date: Jan. 17, 2008

(65) Prior Publication Data
US 2009/0308973 A1 Dec. 17, 2009

(30) Foreign Application Priority Data
Jul. 12, 2006 (FR) ...................... 06 06345

(51) Int. Cl.
*B64D 11/00* (2006.01)
(52) U.S. Cl. ..................................... 244/119; 244/118.5

(58) Field of Classification Search ............... 244/118.1, 244/118.5, 118.6
See application file for complete search history.

(56) References Cited

U.S. PATENT DOCUMENTS

| 4,055,317 | A | | 10/1977 | Greiss |
| 4,071,210 | A | | 1/1978 | Mutke |
| 5,875,997 | A | * | 3/1999 | Al-Sabah .................. 244/118.5 |
| 6,273,363 | B1 | | 8/2001 | Sprenger |
| 7,699,264 | B2 | * | 4/2010 | Guering .................... 244/118.6 |
| 2006/0054741 | A1 | * | 3/2006 | Mills et al. ................. 244/118.5 |
| 2009/0308973 | A1 | * | 12/2009 | Guering ......................... 244/58 |

OTHER PUBLICATIONS

U.S. Appl. No. 12/336,988, filed Dec. 17, 2008, Guering, et al.
U.S. Appl. No. 12/373,055, filed Jan. 9, 2009, Guering.

* cited by examiner

*Primary Examiner* — Frank T Palo
(74) *Attorney, Agent, or Firm* — Oblon, Spivak, McClelland, Maier & Neustadt, L.L.P.

(57) ABSTRACT

In a rear cone of a fuselage of an airplane a pressurized space is arranged in the rear cone and extends up to an impervious strong wall, placed on a rear portion of the length covered by a fin. The pressurized space constitutes an area accessible to individuals and is able to constitute, in particular, a rest and service area for the crew.

12 Claims, 2 Drawing Sheets

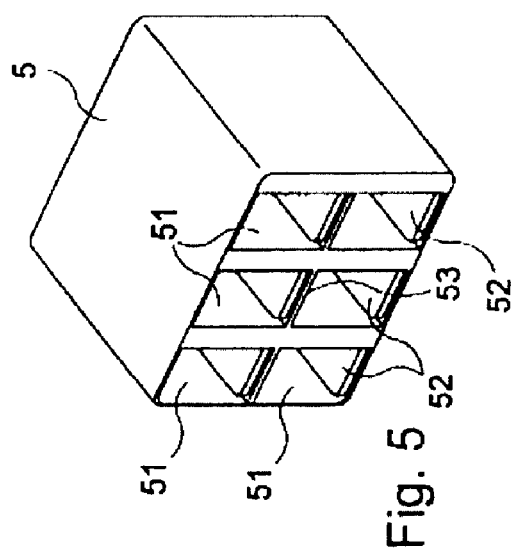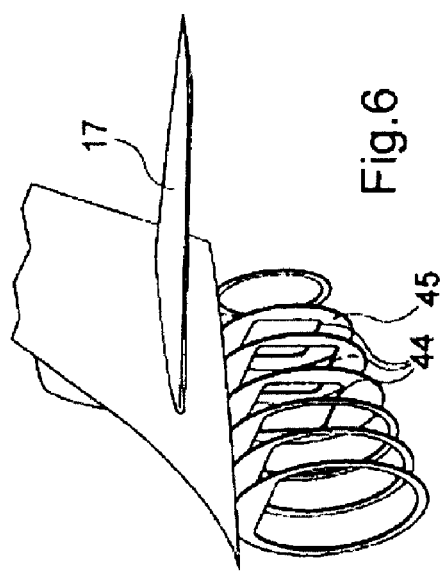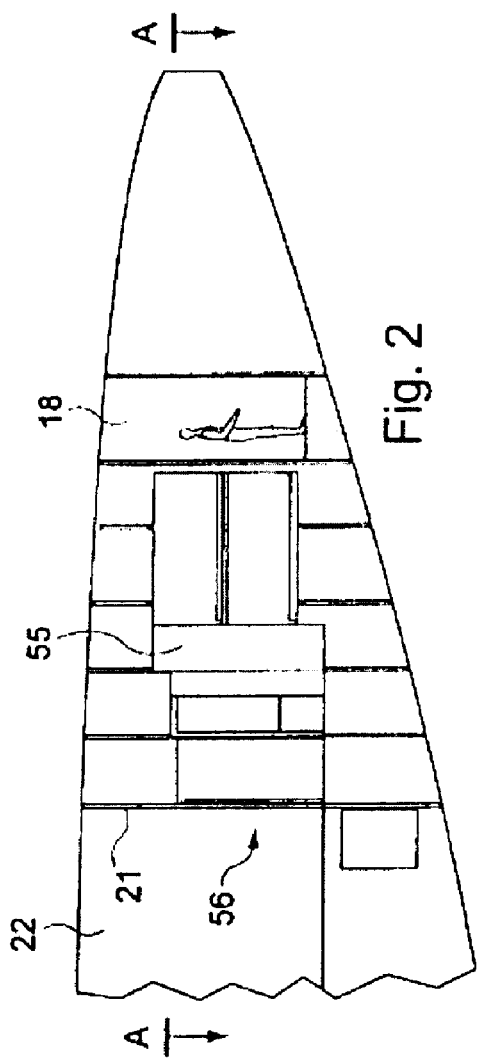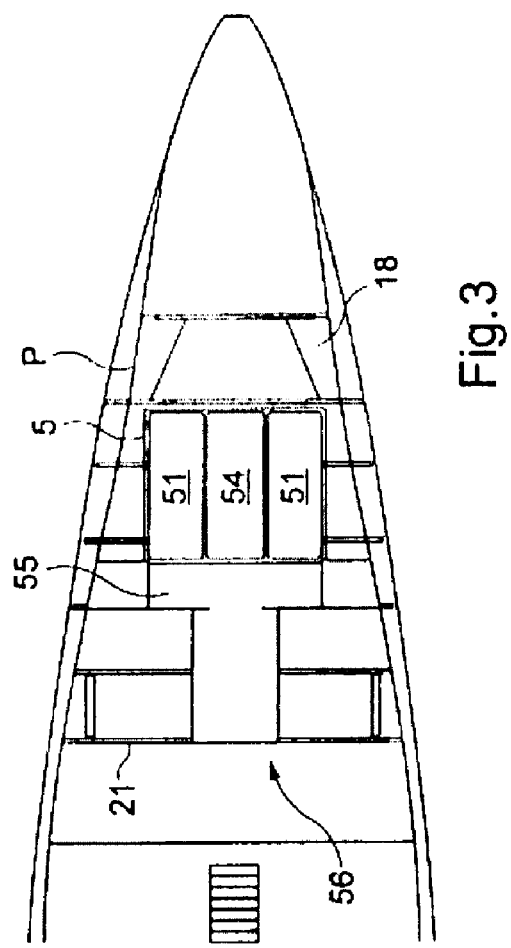

AIRCRAFT TAIL CONE

BACKGROUND OF THE INVENTION

The invention has as its object a specific layout of an airplane rear cone.

As a general rule, an airplane comprises a fuselage having a front portion in which a cockpit is arranged, a main portion that bears the wings and a rear cone usually ending in a point and bearing the fin and the stabilizer.

In the case of an airplane for transport of passengers, at least the main portion of the fuselage is separated into two superposed zones by a floor forming a main deck, respectively a pressurized and air-conditioned upper zone in which a passenger cabin is arranged and a lower zone, generally pressurized but not air-conditioned, forming a hold for the baggage or other loads transported.

This pressurized whole is closed off, at the rear, by a transverse wall forming an impervious back resistant to the pressure difference between the pressurized passenger cabin and the hold and the rear cone. Until now, this transverse wall was placed at the beginning of the zone of the fuselage bearing the fin. As a matter of fact, the rear cone that extends up to the tail of the airplane, over the entire length covered by the fin and the dimensions of which, in cross section, gradually decrease, was regarded as a space not usable for the passengers and served as a hold or service space, the tail of the fuselage, however, being able to be used for placing therein an auxiliary power unit referred to as "APU" (Auxiliary Power Unit).

The constant growth of air traffic, however, leads to increasing the dimensions of the airplanes, in particular of the airliners used for great distances. Furthermore, for long trips, it is necessary to enhance the comfort of the passengers, in particular by offering them relaxation zones. Moreover, in such airplanes, it also is necessary to provide rest and relaxation areas for the crew the size of which is relatively large.

BRIEF SUMMARY OF THE INVENTION

The invention provides a solution to such problems by virtue of a more judicious use of the internal space of the fuselage and, in particular, of the rear cone.

According to the invention, a pressurized space is arranged in the rear cone and extends up to an impervious, strong wall placed on a rear portion of the length covered by the fin, the said pressurized space constituting an area accessible to individuals.

In the case of an airplane for transport of passengers having a fuselage separated into two superposed zones by a floor forming a main deck, respectively an upper zone in which a passenger cabin is arranged and a lower zone forming a hold, the upper zone is continued into the rear cone by a pressurized space extending over the greater part of the length covered by the fin and in which a relaxation area for the crew may be laid out, with a lounge, berths and bathroom facilities.

In the case of an airplane comprising an auxiliary power unit placed at the rear end of the fuselage, the pressurized space is continued up to an impervious transverse wall placed directly in front of the auxiliary power unit.

In particularly advantageous manner, the pressurized space of the rear cone is arranged on a floor placed in the continuation of the main deck and rising gradually by degrees going toward the rear, so as to follow the lower profile of the fuselage, while maintaining a sufficient height for individuals.

The rear end of the passenger cabin preferably is fitted out as a relaxation zone for the passengers.

According to another advantageous characteristic, the rear stabilizer is fastened onto the fin, so as to provide, in the rear cone, a maximum volume compatible with an optimal aerodynamic profile.

Furthermore, at least a part of the pressurized space arranged in the rear cone can be fitted out to accommodate a rest module for the crew, comprising at least two levels of cells equipped with individual berths.

This rest module advantageously can be prefabricated in the factory and has a parallelepipedal outer form, so as to be slipped into openings of rectangular conjugate form arranged in at least two frames of the fuselage, in the rear cone.

Other advantageous characteristics of the invention will come to light in the following description of a specific embodiment presented by way of example and shown on the attached drawings.

BRIEF DESCRIPTION OF THE SEVERAL VIEWS OF THE DRAWINGS

FIG. 2 is a view in longitudinal section on an enlarged scale.

FIG. 3 is a view in horizontal section along line AA of FIG. 2.

FIG. 5 shows, in perspective, an example of a rest module.

FIG. 6 is a view in perspective of the rear cone, with partial cutaway.

DETAILED DESCRIPTION OF THE INVENTION

Figure 1:
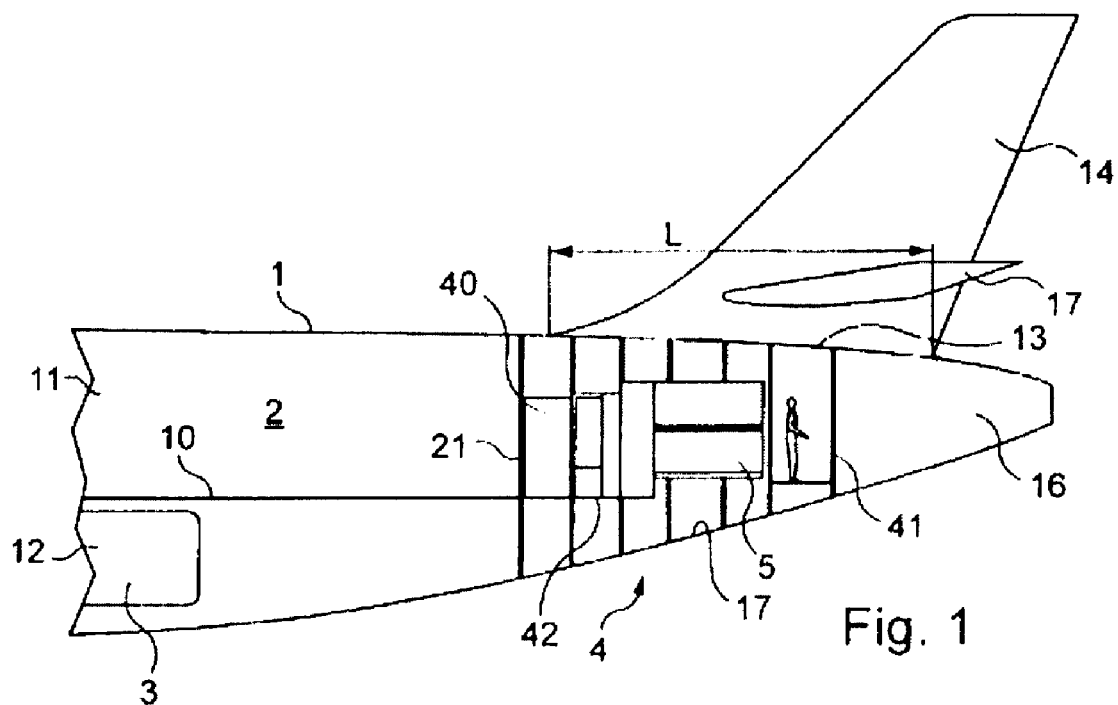
FIG. 1 is a view in longitudinal section of the rear cone of an airplane manufactured according to the invention.
Figure 4:
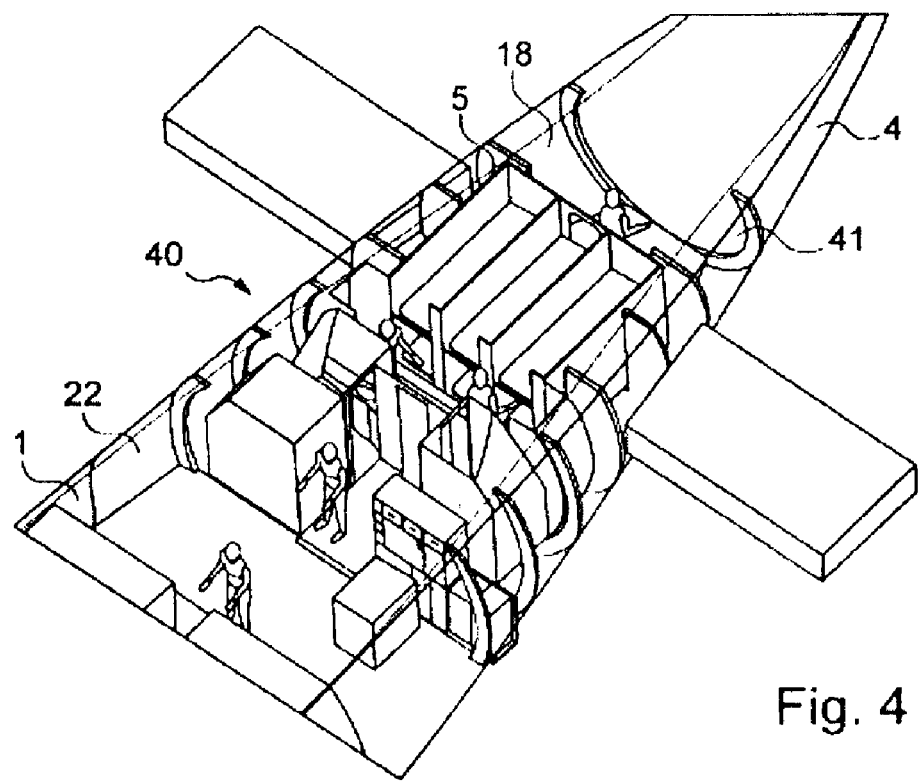
FIG. 4 shows, in perspective, an example of use of the rear cone.

On FIG. 1 there was shown, in longitudinal section, the rear cone 4 of the fuselage 1 of an airplane separated into two zones by a floor 10 forming a main deck, respectively a pressurized and air-conditioned upper zone 11, in which a passenger cabin 2 is arranged, ands a lower zone 12, only pressurized, forming a hold 3 for the baggage and other loads transported.

As has been indicated, the pressurized zones must be closed off at their rear end by an impervious transverse wall resistant to the pressure difference between the passenger cabin 2 and the outside.

Until now, taking into consideration the usual dimensions of the fuselages in height, this impervious back was placed more or less at the beginning of the portion 13 of the fuselage bearing the base of the fin 14 and extending over a length L. The non-pressurized rear cone 4 did not have any commercial use.

On the other hand, according to the invention, the pressurized space is continued toward the rear, underneath the fin 14, by a space 40 also pressurized, that may be extended over the greater part, for example approximately two-thirds, of the length L covered by the fin 14, up to an impervious strong transverse partition 41, that may be placed directly in front of the auxiliary power unit 16 that often is placed at the tail of the fuselage.

This pressurized space 40 is arranged above a floor 42 the front portion of which is placed in the continuation of the main deck 10 and that may rise gradually by degrees going toward the rear, so as to follow the lower profile 17 of the fuselage, while maintaining a sufficient height for individuals up to the impervious partition 41, taking into consideration the height necessary for fastening of the fin along the upper portion 13 of the fuselage.

As FIGS. 2 and 3 show, this additional pressurized space 40 advantageously may serve as a rest area for the crew with a lounge, berths and bathroom facilities.

In the preferential embodiment shown on the Figures, this rest area comprises, in particular, a bedding module 5 made up, in the manner shown on FIG. 5, of several cells 51 laid out one next to the other on two levels, and each having longitudinal and transverse dimensions making it possible to equip each of them with an individual berth 52. Preferably, the floor 53 separating the two central cells is folding so as to provide a gangway 54 (FIG. 3) making it possible to have access, for example, to a technical zone 18, accessible in flight if need be, and arranged at the rear end of the pressurized space 40, just in front of the impervious wall 41.

In front of the rest module 5 there may be placed a passageway 55 for access to the berths, with storage units and a service zone 56 comprising, for example, a central aisle providing access to bathroom facilities and possibly to a small lounge for the crew, or else to storage and service units.

All this pressurized space 40 reserved for the crew may be separated from the passenger cabin 2 by a strong partition 21 provided with a reinforced door to shield the crew in the event of a skyjacking incident, the pressurized space 40 and the passenger cabin 2, the same as the cockpit placed in the front of the airplane, being able to be equipped with separately controlled pressurization and air-conditioning circuits.

As FIGS. 5 and 6 show, the bedding module 5 may constitute a parallelepipedal grouping, prefabricated in the factory, that is slipped into holes 44 of conjugate rectangular form arranged in two successive frames 45 of the structure of the airplane.

Furthermore, the rear stabilizer 17 preferably is fastened directly to the base of the fin 14. This makes it possible to eliminate the rear gripping P shown in dashes on FIG. 3, that usually is necessary for the articulation of the adjustable horizontal plane of the rear stabilizer on the fuselage 1. In this way it is possible to widen the rear cone while giving it a maximum volume compatible with an optimal aerodynamic profile of the fuselage.

As the service area 56 is placed in the additional pressurized space 40, in the rear cone, the passenger cabin 2 may be lengthened by a relaxation space 22 for the passengers, making it possible to stand upright, and in which self-service vending machines and a coffee corner may be placed.

Of course, the invention is not limited to the details of the embodiment that has just been described by way of mere example; other arrangements may be implemented to make judicious use of the additional pressurized space 40 provided in this way in the rear cone.

The invention claimed is:

1. A rear cone of an airplane, including a fuselage with a front point and a main portion, the rear cone comprising:
a fin;
a stabilizer; and
a pressurized space arranged in the rear cone and that extends underneath the fin up to an impervious strong transverse wall, placed on a rear portion of the pressurized space, the pressurized space constituting an area accessible to individuals,
wherein the pressurized space extends at least one-half of a length of the fin in an axial direction of the fuselage.

2. A rear cone according to claim 1,
wherein the fuselage is separated into two superposed zones by a floor forming a main deck, respectively forming a pressurized and air-conditioned upper zone in which a passenger cabin is arranged, and a pressurized lower zone forming a hold, and
wherein the pressurized upper zone is continued into the rear cone by the pressurized space.

3. A rear cone according to claim 2, wherein the pressurized space of the rear cone is arranged on a floor placed in a continuation of the main deck and rising gradually by degrees going toward the rear, so as to follow the lower profile of the fuselage, while maintaining a sufficient height for individuals.

4. A rear cone according to claim 2, wherein the pressurized upper zone of the fuselage includes a main passenger cabin and the pressurized space of the rear cone is separated from the main passenger cabin by a partition that includes a reinforced door.

5. A rear cone according to claim 4, wherein the pressurized space of the rear cone is pressurized and air-conditioned separately from the main passenger cabin.

6. A rear cone according to claim 1, further comprising:
an auxiliary power unit located at a rear end of the fuselage,
wherein the pressurized space is continued up to the impervious strong transverse wall located directly in front of the auxiliary power unit.

7. A rear cone according to claim 1, wherein the pressurized space of the rear cone comprises a rest area for the crew, with storage and service units, berths, and bathroom facilities.

8. A rear cone according to claim 1, wherein a rear end of the passenger cabin is fitted out as a relaxation zone for the passengers.

9. A rear cone according to claim 1, wherein the stabilizer is fastened to the fin, to provide in the rear cone a maximum volume compatible with an optimal aerodynamic profile.

10. A rear cone according to claim 1, wherein at least a part of the pressurized space arranged in the rear cone accommodates a rest module for the crew comprising at least two levels of cells including individual berths.

11. A rear cone according to claim 10, wherein the rest module is prefabricated in a factory and has a parallelepipedal outer form that slips into holes of a rectangular conjugate form, arranged in the rear cone in at least successive frames of a structure of the fuselage.

12. An airplane, comprising a rear cone according to claim 1.

* * * * *